United States Patent
Polidori

(12) 
(10) Patent No.: US 6,173,104 B1
(45) Date of Patent: Jan. 9, 2001

(54) DEAD END CONNECTOR FOR FIBER OPTIC CABLE

(75) Inventor: Mario Polidori, Medford Lakes, NJ (US)

(73) Assignee: Thomas P. Polidori, Medford, NJ (US)

( * ) Notice: Under 35 U.S.C. 154(b), the term of this patent shall be extended for 0 days.

(21) Appl. No.: 09/451,001

(22) Filed: Nov. 29, 1999

Related U.S. Application Data

(63) Continuation of application No. 08/911,238, filed on Aug. 15, 1997, now Pat. No. 6,023,549.

(51) Int. Cl.[7] ........................................... G02B 6/00
(52) U.S. Cl. ............................. 385/136; 385/134
(58) Field of Search ................................. 385/136, 134, 385/137; 174/73.1, 42, 60, 63; 14/22; 428/67

(56) References Cited

U.S. PATENT DOCUMENTS

| 4,612,680 | * | 9/1986 | Daiguji ........................... 14/22 |
| 5,346,742 | * | 9/1994 | Dehling .......................... 428/67 |
| 6,023,549 | * | 2/2000 | Polidori ......................... 385/135 |

* cited by examiner

Primary Examiner—John D. Lee
Assistant Examiner—Ellen E. Kim
(74) Attorney, Agent, or Firm—Norman E. Lehrer

(57) ABSTRACT

A dead end connector comprising an elongated base with a channel extending along the length thereof, a cover with a second channel, and bolts for securing the two units together so that the channels form a bore through which a fiber optic cable is received, where each of the channels has at least one hardened steel insert with inner teeth which grip the cable and outer teeth which grip the base or cover. A vibration damper may be formed as part of the connector or as a separate piece which is attached to the connector.

16 Claims, 3 Drawing Sheets

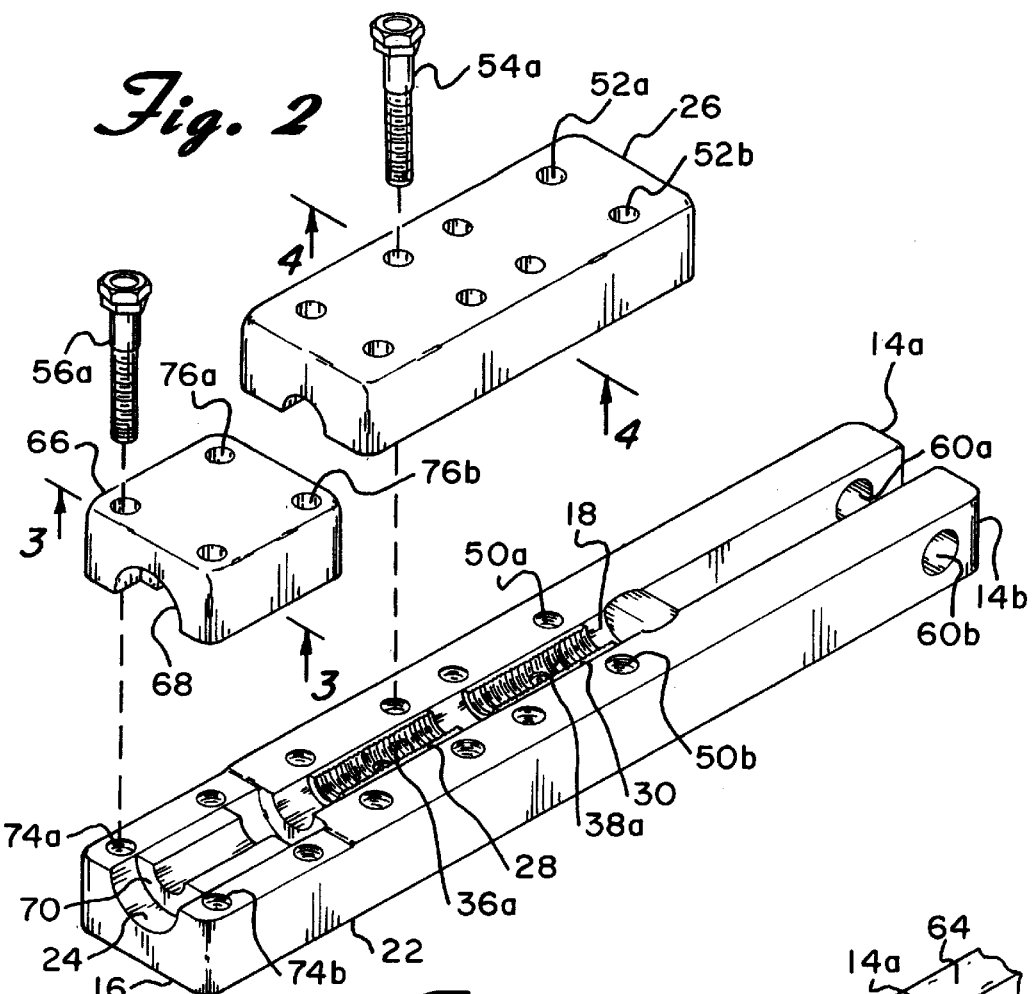
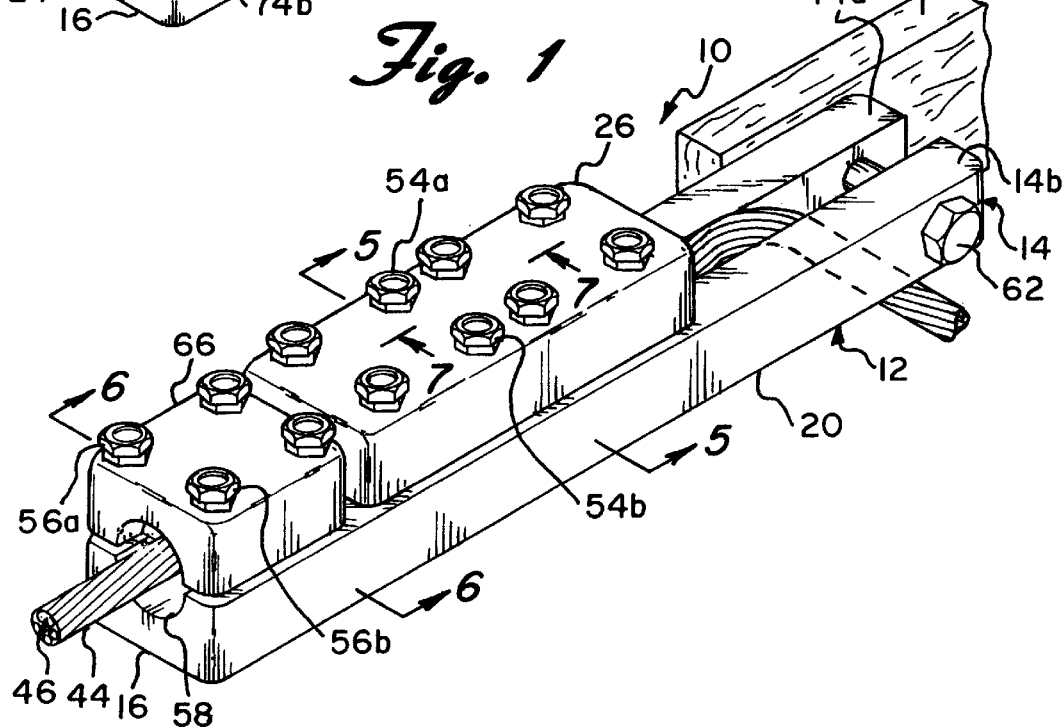

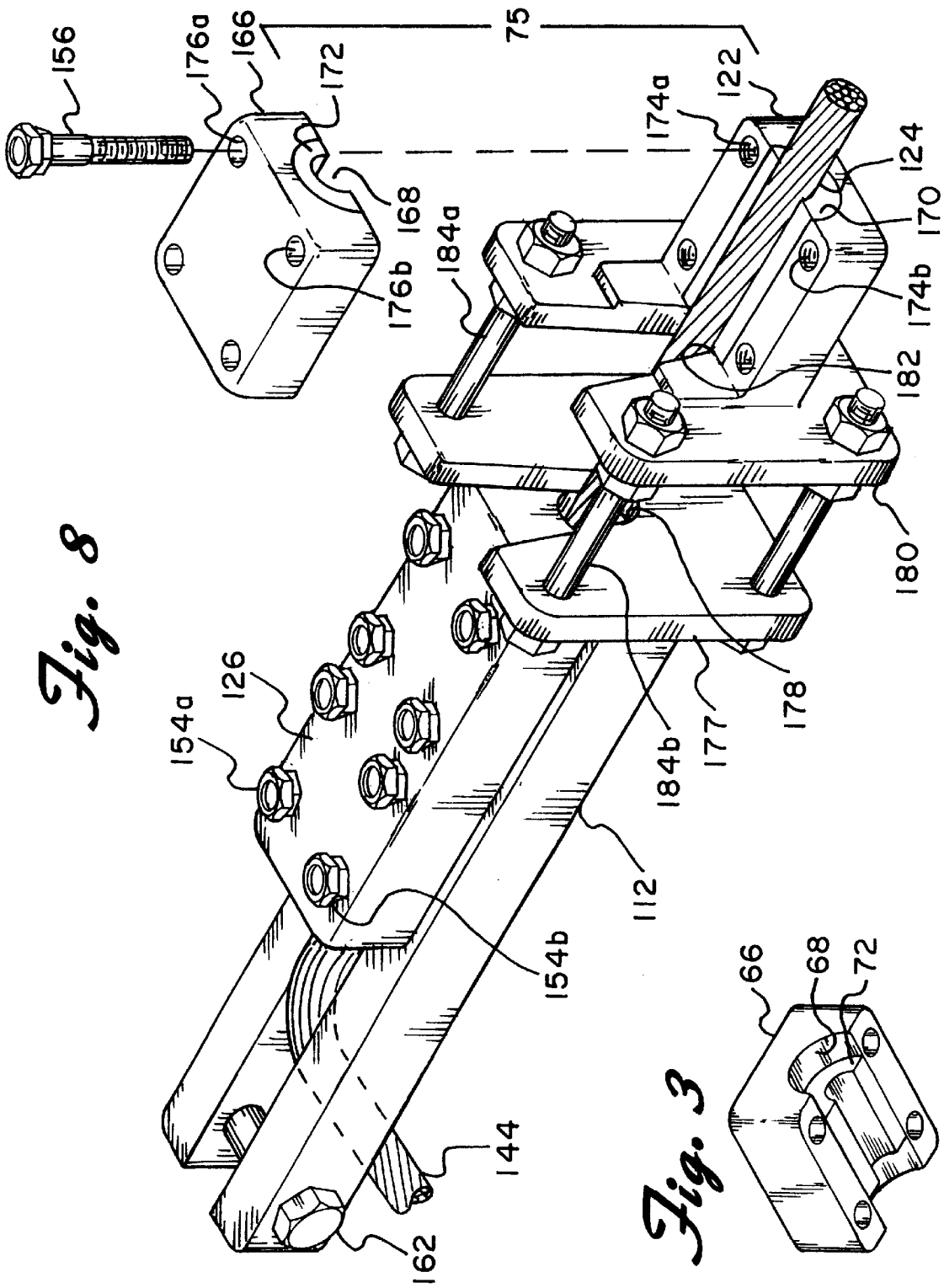

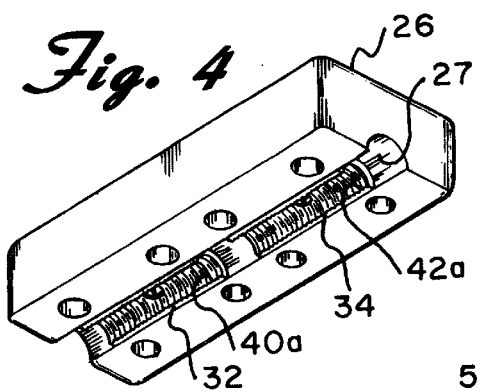
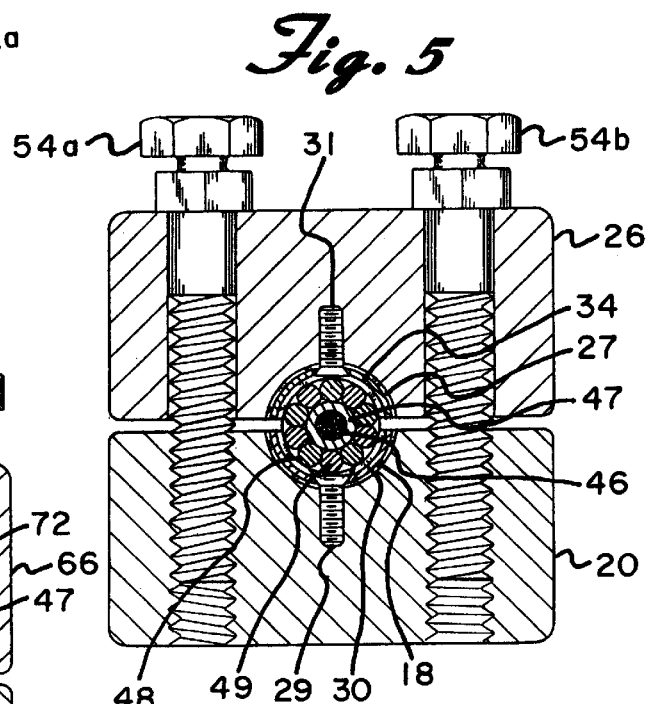
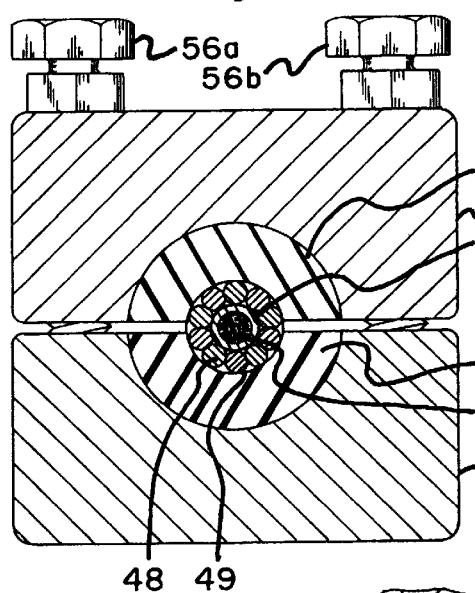
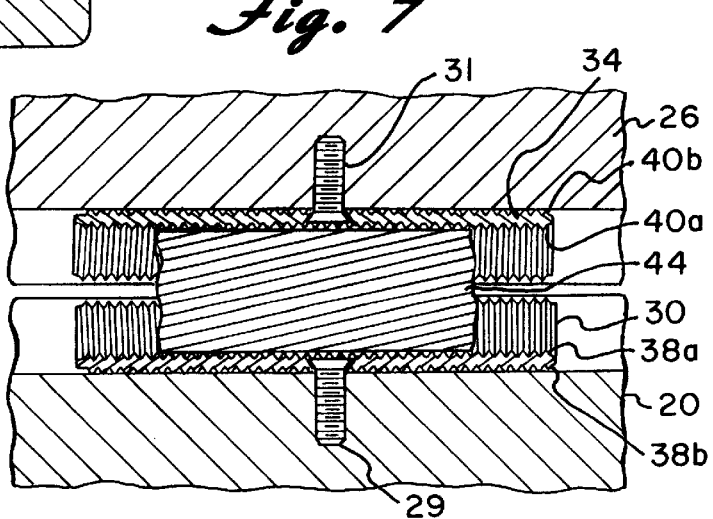

DEAD END CONNECTOR FOR FIBER OPTIC CABLE

CROSS-REFERENCE TO RELATED APPLICATIONS

This application is a Continuation of U.S. application Ser. No. 08/911,238 filed Aug. 15, 1997, now patented U.S. Pat. No. 6,023,549.

BACKGROUND OF THE INVENTION

The present invention is directed toward a dead end connector with a vibration damper for a fiber optic cable and more particularly toward a connector which does not deform the cable when it is being clamped and connected to another fiber optic cable.

A fiber optic cable is a very small cable that may be protected by an outer, much larger cable comprised of a number of twisted strands of aluminum and steel. These cables are run from one telephone pole to another telephone pole for distribution. When the end of a cable is reached, it may either be clamped so that the fiber optic cable within the protective cable can then be connected to a second cable for further distribution or the cable may be severed and spliced with the second cable. Unfortunately, there are problems associated with both of these methods.

First of all, if the cable is clamped, conventional clamps cannot be used because these clamps create an extreme radial compressive force on not only the outer cable but also on the more sensitive inner optic cable. This compressive force causes not only the outer protective cable to deform but the inner fiber optic cable as well. Secondly, the approach of severing and splicing the cable is not practical because it can be expensive, time consuming, and does not ensure that the fiber optic cable will be protected against deformation.

Several dead end devices have been designed as alternative approaches to cutting and splicing the cable. One such device is disclosed in U.S. Pat. No. 3,673,312 to Vockroth. Vockroth discloses a dead end connector with two portions welded together where one portion has a plurality of jaws and the jaws may be serrated. A cable passes through the two portions and the jaws. The jaws grip onto the cable when an explosive charge contained within the device is detonated. In this manner, a transmission cable is dead ended without severing the cable. While this patent discloses a clamp with teeth which grip the outer protective cable of the fiber optic cable in order to prevent severing the cable, it does not ensure that the fiber optic cable is protected against deformation.

Another dead end device is described in U.S. Pat. No. 4,770,491 to Champa et al. This patent is also directed toward providing an alternative approach to cutting and splicing the cable but also addresses the problem of an excessive amount of compressive force being applied to the fiber optic cable and damaging the cable. Champa et al disclose an open ended housing assembly which receives a fiber optic cable. The cable is protected by an outer covering and gripping members which are helically wound around the cable. In this device, the housing assembly is slipped onto the fiber optic cable and the gripping members are received and separated by annular flanges. In this manner, the cable is clamped and ready to be connected to another cable without having to sever the cable. This patent, however, does not disclose a clamp with teeth that grip the outer protective cable of the fiber optic cable, thus ensuring that the fiber optic cable will be free from deformation as disclosed in the present invention.

SUMMARY OF THE INVENTION

The present invention is designed to overcome the deficiencies of the prior art discussed above. It is an object of this invention to provide a dead end fiber optic cable connector which prevents the deformation of the cable when it is being connected to another cable.

It is another object of the invention to provide a dead end connector with a vibration damper formed with the connector.

It is a further object of the invention to provide a dead end connector with a vibration damper formed as a separate piece attached to the connector.

In accordance with the illustrative embodiments, demonstrating features and advantages of the present invention, there is provided a dead end connector comprising an elongated base with a channel extending along the length thereof, a cover with a second channel, and a means for securing the base and cover together so that the channels form a bore through which the cable is received, where each of the channels has at least one hardened steel insert with two sets of teeth. One set of teeth grip the cable and the other set of teeth grip the base or cover so that the insert does not move. A vibration damper is also formed as part of the connector.

Other objects, features, and advantages of the invention will be readily apparent from the following detailed description of preferred embodiments thereof, taken in conjunction with the drawings.

BRIEF DESCRIPTION OF THE DRAWINGS

For the purposes of illustrating the invention, there are shown in the accompanying drawings forms which are presently preferred; it being understood that the invention is not intended to be limited to the precise arrangements and instrumentalities shown.

FIG. 1 is a top perspective view of a first embodiment of the dead end connector;

FIG. 2 is an exploded view of the first embodiment of the dead end connector;

FIG. 3 is a bottom perspective view of the block of the first embodiment taken along line 3—3 of FIG. 2;

FIG. 4 is a bottom perspective view of the cover of the first embodiment taken along line 4—4 of FIG. 2;

FIG. 5 is a cross-sectional view of the first embodiment taken along line 5—5 of FIG. 1;

FIG. 6 is a cross-sectional view of the first embodiment taken along line 6—6 of FIG. 1;

FIG. 7 is a partial cross-sectional view of the first embodiment taken along line 7—7 of FIG. 1, and FIG. 8 is an exploded view of a second embodiment of the dead end connector.

DETAILED DESCRIPTION OF THE PREFERRED EMBODIMENTS

Referring now to the drawings in detail wherein like reference numerals have been used throughout the various figures to designate like elements, there is shown in FIG. 1 a dead end connector constructed in accordance with the principles of the present invention and designated generally as 10.

The fiber optic cable, as referred to in the present invention, includes the combination of a fiber optic core which is formed from glass fibers or similar material and is adapted to transmit light pulses between a light source and a receiver; a protective sheath which surrounds the fiber optic core; and helically wound aluminum and steel wires or strands which surround the sheath.

In the preferred embodiment, the dead end connector essentially includes a base 12 and a cover 26, preferably of aluminum. The base 12 is an elongated block with a first part 20, a second part 22, a first end 14 with bifurcated legs 14a and 14b, a second end 16, and a channel 18 extending along a part of the length of the first part 20 of the block. Screwed into the channel 18 are two semi-cylindrical hardened steel inserts 28 and 30. As seen in FIG. 5, screw 29 secures insert 30 into channel 18. The inserts 28 and 30 have inner teeth 36a and 38a, respectively, which are capable of gripping a fiber optic cable 44. The teeth 36a and 38a are approximately one thirty seconds of an inch in height. The steel inserts 28 and 30 also have outer teeth which grip the base so that movement of the inserts is limited. For example, see FIG. 7 which shows insert 30 with outer teeth 38b.

The cover 26 also has a channel 27 extending the length thereof with steel inserts 32 and 34 secured within the channel 27. Once again, the steel inserts 32 and 34 are screwed into the channel 27. FIG. 5 shows screw 31 used to screw metal insert 34 into channel 27. The inserts 32 and 34 also have inner teeth 40a and 42a, respectively, which are capable of gripping the cable 44. Teeth 40a and 42a are of the same dimension as teeth 36a and 38a. Again, inserts 32 and 34 have outer teeth which grip the cover, as seen in FIG. 7 where insert 34 is shown with outer teeth 40b. Preferably, channel 27 in the cover 26 is the same length as the channel 18 of the base 12.

Both the base 12 and cover 26 also have a number of screw holes located along either side of their respective channels 18 and 27. As an example, FIG. 2 shows screw holes 50a and 50b of the base and screw holes 52a and 52b of the cover. Bolts, such as 54a and 54b, are screwed through the holes in order to secure the cover to the base. When the units are secured together, the channels 18 and 27 form a bore within which the cable 44 is received. The base 12 also has screw holes 60a and 60b located in the legs 14a and 14b, respectively, of the first end 14 of the block. (See FIG. 2.) A bolt 62 is screwed through these holes and secures the base to a block 64.

The second part 22 of the base acts with an aluminum block 66 to form a vibration damper. The second part of the base has a channel 24 continuous with channel 18 and has a rubber insert 70 secured within the channel 24. Screw holes, such as 74a and 74b, are located on the second part 22, along either side of the channel 24. The block 66 has a channel 68 extending along the length thereof. A rubber insert 72 is also secured within this channel and screw holes, such as 76a and 76b are formed on the block 66 along either side of the channel 68. The rubber inserts 70 and 72 are secured to their respective channels by an adhesive. The block 66 is secured to the second part 22 by bolts, for example 56a and 56b, being screwed into the holes of the block and the second part. The channels of the second part and block form a bore 58 in which the fiber optic cable 44 is received.

In order to dead end a cable, the connector 10 is secured to block 64 and cable 44 is dimensioned so as to fit securely within the channels 18 and 24 of the base so that the cable extends beyond the first end of the base. The fiber optic core 46 is protected by an outer sheath 47. The core 46 and the sheath 47 are surrounded by a number of helically wound aluminum and steel wires 48 and 49, respectively. The cover is then placed on the base and is bolted thereon. In this manner, the channels 18 and 27 form a bore and the steel inserts surround the cable. As the base and cover are bolted together, the inner teeth of the steel inserts grip the fiber optic cable and the outer teeth grip the base and cover. In this manner, movement of the inserts is prevented. Moreover, because the diameter of the inner teeth are one thirty seconds of an inch, the fiber optic cable can only be gripped to that extent, ensuring that the fiber optic core remains protected. That is, the amount of force applied to the bolts and the dimensions of the cable, bore and steel inserts allow for the secure gripping of the cable without damaging the inner fiber optic core. Only the outer surface of the cable is deformed by the teeth on the steel inserts and this is done only in a controlled amount.

Thereafter, the block 66 is placed on the second part 22 of the base and is bolted thereon. The channels 24 and 68 form bore 58. The rubber inserts surround the cable and grip the fiber optic cable, deadening any vibration through the cable and connector. The cable is now dead ended in a manner which does not sever or deform the fiber optic core and the cable is ready to be connected to another cable so that the fiber optic core may be further distributed.

FIG. 8 illustrates a second embodiment of the present invention. In this embodiment, the vibration damper 75 includes two halves 122 and 166 of a block separate from the connector. The first half 122 has a channel 124 which extends along the length of the first half. Likewise, the second half 166 has a channel 168 which also extends along the length of the second half. Screw holes, such as 174a and 174b on the first half and 176a and 176b on the second half receive bolts (shown in an exemplary manner as 156) in order to secure the two halves together. When the halves 122 and 166 are joined together their respective channels 124 and 168 form a bore through which the fiber optic cable 144 is received. As in the first embodiment, the channels 124 and 168 each have a rubber insert 170 and 172, respectively, secured therein. These rubber inserts are capable of gripping the cable 144.

The vibration damper is attached to the rest of the connector by means of a first plate 177 and a second plate 180. Each plate 177 and 180 has a V-shaped opening 178 and 182, respectively, so that the cable 144 may be inserted into the openings when the plates are aligned. The plates are generally square. The first plate 177 is secured to an end of the base 112 so that the plate is perpendicular to the base. The plate 177 may be welded or bolted onto the base. However, any means of securing known in the art may be used. The first plate 177 also has a screw hole located in each corner of the plate. The second plate 180 is secured to an end of the first half 122 of the block so that the second plate faces the first plate. The second plate also has a screw hole in each corner of the plate. Again, the second plate 180 is secured to the first half 122 in such a manner so as to be perpendicular to the first half. In order to attach the vibration damper to the connector, bolts such as 184a and 184b are screwed through the screw holes of the first plate and into the screw holes of the second plate so that the openings 178 and 182 of the plates 177 and 180, respectively, are aligned. In this manner, the vibration damper is attached to but spaced apart from the connector.

The rest of the connector, as in the first embodiment, includes a base 112 and a cover 126. The base is an elongated block and has a channel extending the length of the block. Screwed into the channel are two semi-cylindrical hardened steel inserts with inner teeth which are capable of gripping a fiber optic cable and outer teeth which grip the base. The cover also has a channel extending the length thereof with steel inserts within the channel where the inserts are screwed into the channel. These inserts also have inner teeth which are capable of gripping the cable and outer teeth which grip the cover. The channel in the cover is the same length as the channel of the base.

Again, the base and cover each have screw holes located on either side of the channels. Bolts, such as 154*a* and 154*b*, are screwed through the holes in order to secure the cover to the base. When the units are bolted together, the channels form a bore within which the cable 144 is received. The base also has screw holes located on the sides of the base at an end opposite the end with the attached plate. A bolt 162 screwed through these holes secures the base to a block.

In order to use this dead end connector, a cable 144 is inserted into the channel of the base so that the cable extends through the opening 178 of the first plate 177 and beyond the end of the base. The cable continues through the opening 182 of the second plate 180 and rests within the channel of the first half 122 of the block. The fiber optic cable, as in the first embodiment, is one typically used in the art where the fiber optic core is protected by a sheath. The core and sheath are surrounded by a number of helically wound aluminum and steel wires. The cover is then placed over the channel of the base and is bolted thereon. In this manner, the inner teeth of the steel inserts grip the fiber optic cable, and the outer teeth grip the base and cover, limiting movement of the inserts. Again, as in the first embodiment, because the diameter of the inner teeth are one thirty seconds of an inch, the fiber optic cable can only be gripped to that extent, ensuring that the fiber optic core remains protected. Next, the second half 166 of the block is placed on top of the first half 122 of the block and is bolted thereon. The rubber inserts 170 and 172 grip the fiber optic cable and deaden any vibration through the cable and connector. The cable is now dead ended as in the first embodiment and is ready to be connected to another cable for further distribution of the fiber optic core.

The present invention may be embodied in other specific forms without departing from the spirit or essential attributes thereof and accordingly, reference should be made to the appended claims rather than to the foregoing specification as indicating the scope of the invention.

I claim:

1. A dead end connector for a fiber optic cable comprising:
    an elongated base with a first channel, a first portion, and a first insert secured within said first channel, said first channel extending along a length of said first portion;
    an elongated cover with a second channel and a second insert secured within said second channel, said second channel extending along a length of said cover;
    securing means securing said cover to said base, and
    said first and second channels forming a bore when said base and cover are secured together through which a fiber optic cable may extend
    wherein each of said first and second inserts has a plurality of inner teeth which grip the fiber optic cable and each of said first and second inserts has a plurality of outer teeth said base engages said plurality of teeth on said first insert and said cover engages said plurality of teeth on said second insert.

2. The dead end connector as claimed in claim 1 wherein said first and second inserts are metal.

3. The dead end connector as claimed in claim 1 wherein said securing means includes screw holes in said base and cover and bolts screwed through said holes in order to secure said base and cover together.

4. The dead end connector of claim 1 wherein said base includes a second portion with a second channel therethrough.

5. The dead end connector of claim 4 wherein said second channel has a rubber insert secured therein which is capable of gripping the fiber optic cable.

6. The dead end connector of claim 5 further including a block secured to said second portion, said block having a channel with a second rubber insert secured therein, and said channel of said block forming a bore with said channel of said second portion through which the fiber optic cable may extend and be gripped by said first and second rubber inserts.

7. The dead end connector of claim 1 further comprising a vibration damper and a means for attaching said vibration damper to said base.

8. The dead end connector of claim 7 wherein said vibration damper includes a block with a first half and a second half, each of said first and second halves having a channel extending along a length thereof and a rubber insert within each of said channels.

9. A dead end connector for a fiber optic cable comprising:
    an elongated base with a first channel and a first portion, said first channel extending along a length of said first portion;
    an elongated cover with a second channel, said second channel extending along a length of said cover;
    securing means securing said cover to said base;
    said first and second channels forming a bore when said base and cover are secured together through which a fiber optic cable may extend; and
    at least one insert secured within one of said first and second channels,
    wherein said at least one insert has a plurality of inner teeth which grip the fiber optic cable and a plurality of outer teeth, one of said base and cover engages said plurality of outer teeth.

10. The dead end connector as claimed in claim 9 wherein said insert is metal.

11. The dead end connector as claimed in claim 9 wherein said securing means includes screw holes in said base and cover and bolts screwed through said holes in order to secure said base and cover together.

12. The dead end connector of claim 9 wherein said base includes a second portion with a second channel therethrough.

13. The dead end connector of claim 12 wherein said second channel has a first rubber insert secured therein which is capable of gripping the fiber optic cable.

14. The dead end connector of claim 13 further including a block secured to said second portion, said block having a channel with a second rubber insert secured therein, and said channel of said block forming a bore with said channel of said second portion through which the fiber optic cable may extend and be gripped by said first and second rubber inserts.

15. The dead end connector of claim 9 further comprising a vibration damper and a means for attaching said vibration damper to said base.

16. The dead end connector of claim 15 wherein said vibration damper includes a block with a first half and a second half, each of said first and second halves having a channel extending along a length thereof and a rubber insert within each of said channels.

* * * * *